(No Model.)
L. C. STOLL.
CORKSCREW.
No. 593,698. Patented Nov. 16, 1897.
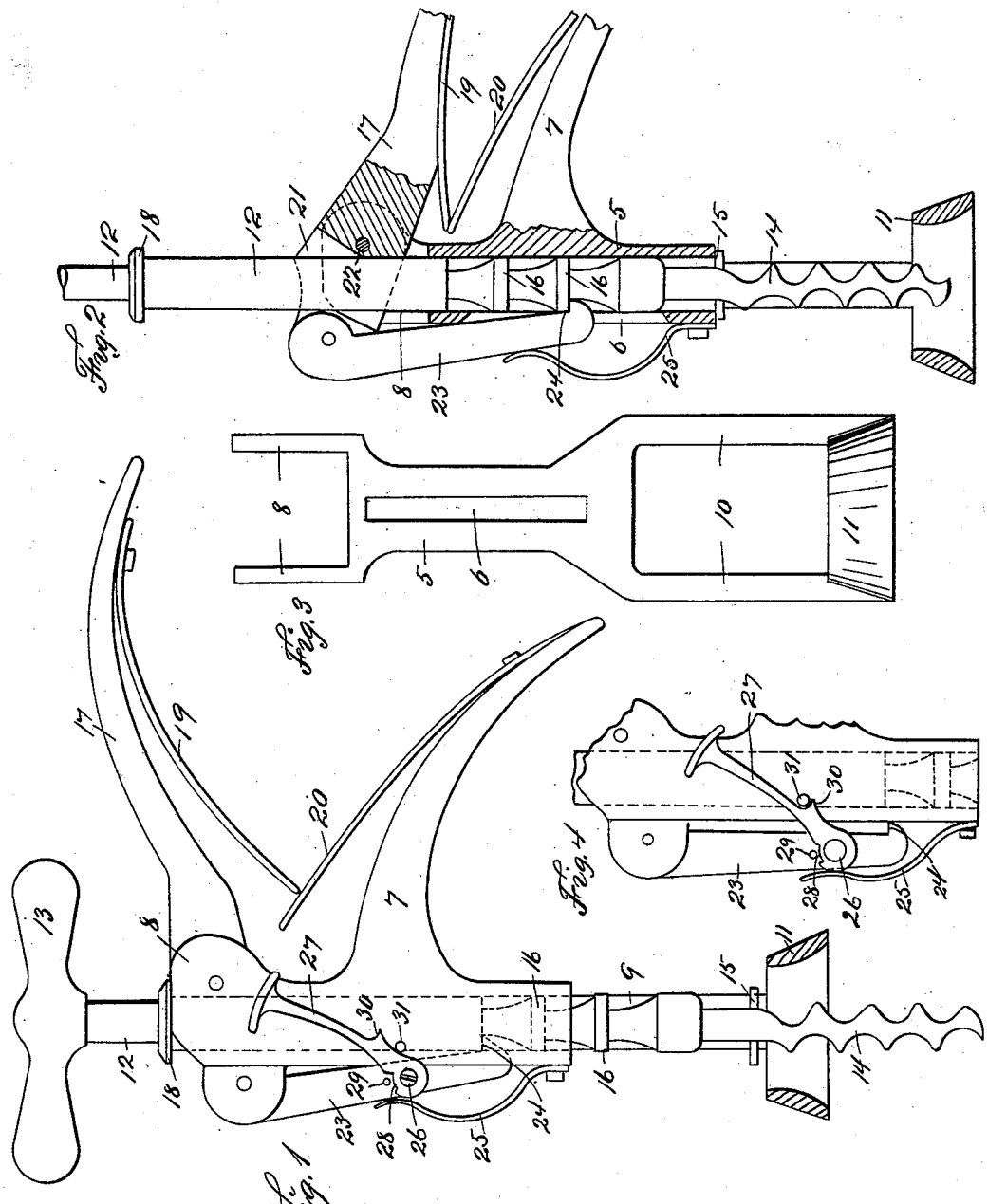
WITNESSES:
C. Nordfors
C. Gerst
INVENTOR
Louis C. Stoll.
BY
Edgar Tate
ATTORNEYS.

UNITED STATES PATENT OFFICE.

LOUIS C. STOLL, OF BROOKLYN, NEW YORK.

CORKSCREW.

SPECIFICATION forming part of Letters Patent No. 593,698, dated November 16, 1897.

Application filed April 30, 1897. Serial No. 634,523. (No model.)

*To all whom it may concern:*

Be it known that I, LOUIS C. STOLL, a citizen of the United States, residing at Brooklyn, in the county of Kings and State of New York, have invented certain new and useful Improvements in Corkscrews, of which the following is a full and complete specification, such as will enable those skilled in the art to which it appertains to make and use the same.

This invention relates to corkscrews; and the object thereof is to provide an improved device of this class by means of which the cork or stopper of a bottle or similar vessel may be quickly and easily withdrawn therefrom, a further object being to provide a device of this class in which the corkscrew proper is mounted, and revoluble in a casing which supports a collar or head which is adapted to rest on the end of the neck of the bottle or other vessel, said casing being provided with devices by means of which the screw may be removed and with it the stopper; said devices being operated by means of a lever pivotally connected with said casing and which forms a part of said devices.

The invention is fully disclosed in the following specification, of which the accompanying drawings form a part, in which—

Figure 1 is a side view of my improved corkscrew; Fig. 2, a sectional side view showing a modified form of construction and showing the parts in a different position; Fig. 3, a back view of the casing through which the screw passes; and Fig. 4, a view of a part of the device shown in Fig. 1, showing the parts in a different position.

In the drawings forming part of this specification the separate parts of my improvement are designated by the same numerals of reference in each of the views, and in the practice of my invention I provide a casing 5, the body portion of which is tubular in form, and said casing is open at each end, and the back thereof is provided with a longitudinal slot 6, and said casing is provided at the front and centrally thereof with a downwardly-directed arm 7 and at its upper end with upwardly-directed jaws 8, which are projected forwardly, as shown in Fig. 1. The casing 5 is also provided with two downwardly-directed arms 10, to the lower ends of which is secured a collar 11, and passing centrally through said casing is a shaft 12, the upper end of which is provided with a handle 13, and said shaft is provided at the lower end thereof with a screw 14, through the shank of which is passed a pin 15, and the lower end of the shaft 12 is provided with a plurality of circular shoulders or projections 16, any desired number of which may be employed, and pivoted in the upper part of the casing 5, between the jaws 8, is a lever 17, through which the shaft 12 passes, and said shaft is provided near its upper end with a collar 18, and secured to the lever 17, near the outer end thereof, is a strong spring 19, which projects in the direction of the casing 5, and the arm 7 is provided with a corresponding spring 20, which is secured thereto near the outer end thereof.

The opening at 21 in the lever 17, through which the shaft 12 passes, is irregular in form, so as to permit said lever to swing on its pivotal connection at 22, and pivotally connected with the outer end of said lever or between two jaws formed by the opening 21, through which the shaft 12 passes, is a dog 23, the lower end of which is provided with an inwardly-directed lug or projection 24, which is adapted to operate in connection with the circular shoulders or projections 16 on said shaft 12, and secured to the lower end of the casing 5 is a spring 25, which is adapted to bear on the lower end of said dog and hold it in the slot 6 of the casing 5 in engagement with one of the shoulders or projections 16 on the shaft 12.

In the construction shown in Figs. 1 and 4 I pivotally connect with the dog 23, as shown at 26, a thumb-lever 27, which is provided with a circular head, in the upper side of which is formed a groove 28, and the dog 23 is provided above the circular head of the lever 27 with a pin or projection 29, and the lower side of the thumb-lever 27 is provided with a prong or projection 30, and the casing 5 is provided with a pin 31, adapted to engage said prong or projection 30, whereby the pawl 23 is held out of engagement with the shoulders or projections on the shaft 12.

The operation of the device will be readily understood from the foregoing description when taken in connection with the accompanying drawings and the following statement thereof.

The normal position of the parts is that shown in Fig. 2, in which position the pin 15 strikes the lower end of the casing 5, and whenever it is desired to remove a cork or stopper from a bottle or similar vessel the collar 11 is placed on the end of the neck of said vessel, and the lever 27 or the upper end thereof is operated so as to release the lower end of the dog 23 from one of the shoulders or projections 16, and the screw 14 is then screwed into and through the cork by means of the handle 13 in the usual manner. In removing the cork it is only necessary to operate the lever 17, and this is done by grasping the arm 7 and the said lever and alternately compressing or pulling the lever 17 downwardly and allowing it to move upwardly, the latter motion being effected by the springs 19 and 20. This operation will permit the dog 23 to successively engage with the shoulders or projections 16 on the shaft 12, and each time that the lever 17 is depressed the cork or stopper will be partially withdrawn.

The lever 27 may or may not be employed and is not shown in Fig. 2, and it will be apparent that this device is simple in construction and operation and well adapted to produce the result for which it is intended, while being also comparatively inexpensive.

Having fully described my invention, I claim as new and desire to secure by Letters Patent—

1. A corkscrew comprising a tubular casing which is provided at one side with a downwardly-directed arm, and at the opposite side with a longitudinal slot, said casing being provided at its upper end with side jaws, and at its lower end with downwardly-directed arms, a collar connected with the lower ends of said arms, a lever pivotally mounted between said jaws, and projecting in the same plane as said outwardly-directed arm, said lever being adapted to swing in a vertical plane, a dog pivotally connected with the end of said lever, the lower end of which is adapted to enter said slot, a spring secured to the lower end of said casing and bearing on the lower end of said dog, and a shaft passing vertically through said casing, and provided at its lower end with a screw which projects in line therewith, said shaft being also provided with circular shoulders or projections in connection with which said dog operates, substantially as shown and described.

2. A corkscrew comprising a tubular casing which is provided at one side with a downwardly-directed arm, and at the opposite side with a longitudinal slot, said casing being provided at its upper end with side jaws, and at its lower end with downwardly-directed arms, a collar connected with the lower ends of said arms, a lever pivotally mounted between said jaws, and projecting in the same plane as said outwardly-directed arm, said lever being adapted to swing in a vertical plane, a dog pivotally connected with the end of said lever, the lower end of which is adapted to enter said slot, a spring secured to the lower end of said casing and bearing on the lower end of said dog, and a shaft passing vertically through said casing, and provided at its lower end with a screw which projects in line therewith, said shaft being also provided with circular shoulders or projections in connection with which said dog operates, said shaft being provided at its upper end with a handle, and said outwardly-directed arm and said lever being each provided with a spring, substantially as shown and described.

3. A corkscrew comprising a tubular casing which is provided at one side with a downwardly-directed arm and at the opposite side with a longitudinal slot, said casing being provided at its upper end with side jaws, and at its lower end with downwardly-directed arms, a collar connected with the lower ends of said arms, a lever pivotally mounted between said jaws, and projecting in the same plane as said outwardly-directed arm, said lever being adapted to swing in a vertical plane, a dog pivotally connected with the end of said lever, the lower end of which is adapted to enter said slot, a spring secured to the lower end of said casing and bearing on the lower end of said dog, and a shaft passing vertically through said casing, and provided at its lower end with a screw which projects in line therewith, said shaft being also provided with circular shoulders or projections in connection with which said dog operates, said shaft being provided at its upper end with a handle, and said outwardly-directed arm and said lever being each provided with a spring, and said dog being also provided with a lever which projects at one side of said casing, and in the direction of said outwardly-directed arm, substantially as shown and described.

In testimony that I claim the foregoing as my invention I have signed my name, in presence of the subscribing witnesses, this 29th day of April, 1897.

LOUIS C. STOLL.

Witnesses:
C. GERST,
A. C. McLOUGHLIN.